US011416921B2

United States Patent
Verma et al.

(10) Patent No.: US 11,416,921 B2
(45) Date of Patent: Aug. 16, 2022

(54) HYPERLINK FUNCTIONALITY FOR ENABLING AN AUCTIONING PLATFORM

(71) Applicant: KYNDRYL, INC., New York, NY (US)

(72) Inventors: Pramod Verma, Fairfax, VA (US); Rachel Leekin, White Plains, NY (US); Seema Nagar, Bangalore (IN); Kuntal Dey, Vasant Kunj (IN)

(73) Assignee: KYNDRYL, INC., New York, NY (US)

( * ) Notice: Subject to any disclaimer, the term of this patent is extended or adjusted under 35 U.S.C. 154(b) by 520 days.

(21) Appl. No.: 16/529,869

(22) Filed: Aug. 2, 2019

(65) Prior Publication Data

US 2021/0035204 A1 Feb. 4, 2021

(51) Int. Cl.
*G06F 16/958* (2019.01)
*G06Q 30/08* (2012.01)
*G06Q 20/08* (2012.01)
*G06F 16/955* (2019.01)

(52) U.S. Cl.
CPC ........... *G06Q 30/08* (2013.01); *G06F 16/958* (2019.01); *G06F 16/9558* (2019.01); *G06Q 20/0855* (2013.01)

(58) Field of Classification Search
CPC .. G06Q 30/08; G06Q 20/0855; G06Q 20/123; G06F 16/958; G06F 16/9558; G06F 40/134
See application file for complete search history.

(56) References Cited

U.S. PATENT DOCUMENTS

| | | | | |
|---|---|---|---|---|
| 7,212,999 | B2 * | 5/2007 | Friesen | G06Q 20/10 705/37 |
| 8,949,377 | B2 * | 2/2015 | Makar | G06Q 30/0253 709/219 |
| 9,817,902 | B2 * | 11/2017 | Rezaei | G06Q 10/02 |
| 9,953,085 | B1 * | 4/2018 | Collins | G06F 16/288 |
| 10,108,971 | B2 * | 10/2018 | Rabbitt | G06Q 30/0243 |
| 10,192,238 | B2 * | 1/2019 | Chatwin | G06Q 30/0256 |
| 2006/0020646 | A1 * | 1/2006 | Tee | G06F 16/14 |
| 2007/0067267 | A1 * | 3/2007 | Ives | G06F 16/951 |
| 2008/0222168 | A1 * | 9/2008 | Morales | G06F 16/3331 707/E17.069 |

(Continued)

*Primary Examiner* — Scott T Baderman
*Assistant Examiner* — Mario M Velez-Lopez
(74) *Attorney, Agent, or Firm* — Ken Han; Andrew M. Calderon; Roberts Calderon Safran & Cole P.C.

(57) ABSTRACT

A computer-implemented method includes receiving a request to activate a hyperlink of a set of hyperlinks within a webpage of a source website. The method further includes executing a script to initiate an auction that is performed by an auctioning platform, wherein the auction comprises a bidding process that is associated with a set of third-party websites. The method further includes determining at least one preferred third-party website selected from the set of third-party websites. The method further includes outputting third-party digital content representative of characteristics of the preferred third-party website that are associated with the characteristics of the activated hyperlink. The method further includes outputting the first digital content while outputting a portion of source digital content representative of characteristics of the source website.

20 Claims, 7 Drawing Sheets

(56) References Cited

U.S. PATENT DOCUMENTS

| | | | |
|---|---|---|---|
| 2009/0043685 A1* | 2/2009 | Benjamin | G06Q 40/00 |
| | | | 705/37 |
| 2009/0138381 A1* | 5/2009 | Bloomfield | G06Q 50/16 |
| | | | 705/26.1 |
| 2009/0182681 A1* | 7/2009 | Bloomfield | G06Q 30/08 |
| | | | 715/205 |
| 2009/0307081 A1* | 12/2009 | Rabbitt | G06Q 30/0251 |
| | | | 707/999.005 |
| 2011/0213642 A1* | 9/2011 | Makar | G06F 16/9535 |
| | | | 705/14.51 |
| 2014/0223462 A1* | 8/2014 | Aimone | H04N 21/4788 |
| | | | 725/10 |
| 2015/0051986 A1 | 2/2015 | Saifee et al. | |
| 2015/0106746 A1* | 4/2015 | Vojak | G06F 3/0488 |
| | | | 715/753 |
| 2016/0042407 A1* | 2/2016 | Els | G06Q 30/0275 |
| | | | 705/14.71 |
| 2016/0162452 A1* | 6/2016 | Moore | G06F 16/951 |
| | | | 715/205 |
| 2017/0103428 A1* | 4/2017 | Saifee | G06Q 30/0275 |
| 2017/0161793 A1 | 6/2017 | Knapp et al. | |
| 2018/0239498 A1 | 8/2018 | Young et al. | |
| 2019/0087868 A1 | 3/2019 | Setty et al. | |
| 2019/0156411 A1* | 5/2019 | Friedman | G06Q 30/08 |
| 2019/0340656 A1* | 11/2019 | Orlandic | G06Q 30/0261 |

\* cited by examiner

HYPERLINK FUNCTIONALITY FOR ENABLING AN AUCTIONING PLATFORM

TECHNICAL FIELD

The disclosure relates to a data processing system and more specifically relates to improving the technical field of hyperlink utilization.

BACKGROUND

A source webpage may include a plurality of hyperlinks. A hyperlink is a reference that points to a particular location or file, providing a user with quick access to the particular location or file. Sometimes, that particular location or file is a website. When a user clicks a hyperlink, the user may be redirected to a destination website. Hyperlinks may be written in hypertext markup language (HTML).

SUMMARY

In one aspect, the disclosure is directed to a method. The method includes receiving a request to activate a hyperlink of a set of hyperlinks within a webpage of a source website. The method further includes executing, based on characteristics of the activated hyperlink of the set of hyperlinks, a script to initiate an auction that is performed by an auctioning platform, wherein the auction comprises a bidding process that is associated with a set of third-party websites that are each different from the source website. The method further includes determining, based on a result of the auction performed by the auctioning platform, at least one preferred third-party website selected from the set of third-party websites. The method further includes outputting, for display within the webpage of the source website, third-party digital content representative of characteristics of the preferred third-party website that are associated with the characteristics of the activated hyperlink. The method further includes outputting, for display within the webpage of the source website, while outputting the first digital content, at least a portion of source digital content representative of characteristics of the source website.

In another aspect, the disclosure is directed to a computing system. The computing system includes at least one processor. The computing system further includes at least one memory device. The computing system further includes at least one module stored by the at least one memory device and executable by the at least one processor, wherein the at least one module is configured to perform operations comprising: receiving a request to activate a hyperlink of a set of hyperlinks within a webpage of a source website. The at least one module is configured to further perform an operation comprising executing, based on characteristics of the activated hyperlink of the set of hyperlinks, a script to initiate an auction that is performed by an auctioning platform, wherein the auction comprises a bidding process that is associated with a set of third-party websites that are each different from the source website. The at least one module is configured to further perform an operation comprising determining, based on a result of the auction performed by the auctioning platform, at least one preferred third-party website selected from the set of third-party websites. The at least one module is configured to further perform an operation comprising outputting, for display within the webpage of the source website, third-party digital content representative of characteristics of the preferred third-party website that are associated with the characteristics of the activated hyperlink. The at least one module is configured to further perform an operation comprising outputting, for display within the webpage of the source website, while outputting the first digital content, at least a portion of source digital content representative of characteristics of the source website.

In another aspect, the disclosure is directed to a computer program product. The computer program product comprises a computer readable storage medium having program code embodied therewith, the program code executable by at least one processor to: receive a request to activate a hyperlink of a set of hyperlinks within a webpage of a source website. The program code is further executable by the at least one processor to execute, based on characteristics of the activated hyperlink of the set of hyperlinks, a script to initiate an auction that is performed by an auctioning platform, wherein the auction comprises a bidding process that is associated with a set of third-party websites that are each different from the source website. The program code is further executable by the at least one processor to determine, based on a result of the auction performed by the auctioning platform, at least one preferred third-party website selected from the set of third-party websites. The program code is further executable by the at least one processor to output, for display within the webpage of the source website, third-party digital content representative of characteristics of the preferred third-party website that are associated with the characteristics of the activated hyperlink. The program code is further executable by the at least one processor to output, for display within the webpage of the source website, while outputting the first digital content, at least a portion of source digital content representative of characteristics of the source website.

The details of one or more aspects of the disclosure are set forth in the accompanying drawings and the description below. Other features, objects, and advantages of the disclosure will be apparent from the description and drawings, and from the claims.

DETAILED DESCRIPTION

In general, this disclosure relates to improving hyperlink functionality within a webpage. More specifically, this disclosure relates to automatically modifying an existing hyperlink to include functionality that initiates an auctioning platform. As described in more detail, one example application for the techniques described herein is utilizing a hyperlink editing assistant to modify a hyperlink so that webpage traffic is maintained within a source webpage. In general, webpage traffic is a major concern for any company considering where on the Internet to place its content within a webpage. Increasing webpage traffic may lead to an increase in revenue from companies requesting to place their third-party content within any specific webpage. In general, webpage traffic may be lost in any number of ways. For example, from a user losing interest in a specific webpage, or by clicking on a hyperlink within the specific webpage, thereby being redirected to a new webpage.

A source webpage may include a plurality of hyperlinks that point to various websites over the Internet. One way to increase readability of text within a source webpage while also including a hyperlink within text is to mask the hyperlink as clickable text (e.g., anchor text). Anchor text includes a descriptive title related to the hyperlink so that the user may have a general description of what the hyperlink is about. Historically, when a webpage visitor clicks on the anchor text, thereby activating the hyperlink, the user is redirected to a new webpage, leaving the source webpage behind. This causes the source webpage to lose webpage traffic, thereby decreasing any associated value gained from the webpage retaining the traffic.

The example techniques described herein may provide technical advantages so as to be directed to practical applications. For example, it may be advantageous to utilize a hyperlink editing assistant that modifies the hyperlink with a script (e.g., in the form "myJavaScriptFunction( )") that, when executed, initiates an auctioning platform where one or more third-party websites can compete to have their digital third-party content, including products or a summary of content from the third-party website, displayed to the webpage visitor for the webpage visitor to purchase. This bidding process may generate monetary value from at least collecting the highest bid(s) from the winning third-party website(s). In addition, any monetary value gained from retaining webpage traffic will not be lost due to keeping the webpage traffic from being redirected to a new webpage.

As an example, a source website, "http://www.information.tld," may include text stating, "A great way to attain your goal is to use <a href="http://www.bluewidgets.tld">blue widgets</a> every morning." When a webpage visitor clicks on the anchor text, "blue widgets," embedded within the text, the webpage visitor will be redirected from the source website to the website "http://www.bluewidgets.tld." This may cause the source website to lose any monetary value gained from retaining webpage traffic to the destination website, "http://www.bluewidgets.tld." Utilizing aspects of the example techniques, a hyperlink editing assistant may edit the hyperlink, "<a href="http://www.bluewidgets.tld">blue widgets</a>," to the form, "<a href='http://www.information.tld' onclick='myJavaScriptFunction( );'>blue widgets</a>." This modification will cause the hyperlink to point to the source website or to an auctioning platform (e.g., an external server) rather than to the website, "http://www.bluewidgets.tld." This way, when a website visitor clicks the modified hyperlink, rather than being redirected to the destination webpage, "http://www.bluewidgets.tld," the user stays on the source webpage, while a popup, adjacent or within the source webpage, displays content from "http://www.bluewidgets.tld."

When the webpage visitor of "http://www.information.tld" clicks on the modified link, the function "myJavaScriptFunction( );" initiates an auction on an auctioning platform (e.g., an external server), initiating an auction where third-party website participants may bid on the chance for the source website to display their digital third-party content to the webpage visitor. The example techniques may lead to the source website gaining monetary value from webpage traffic and from collecting at least one of the bid values submitted by the participating third-party website(s).

Figure 1:
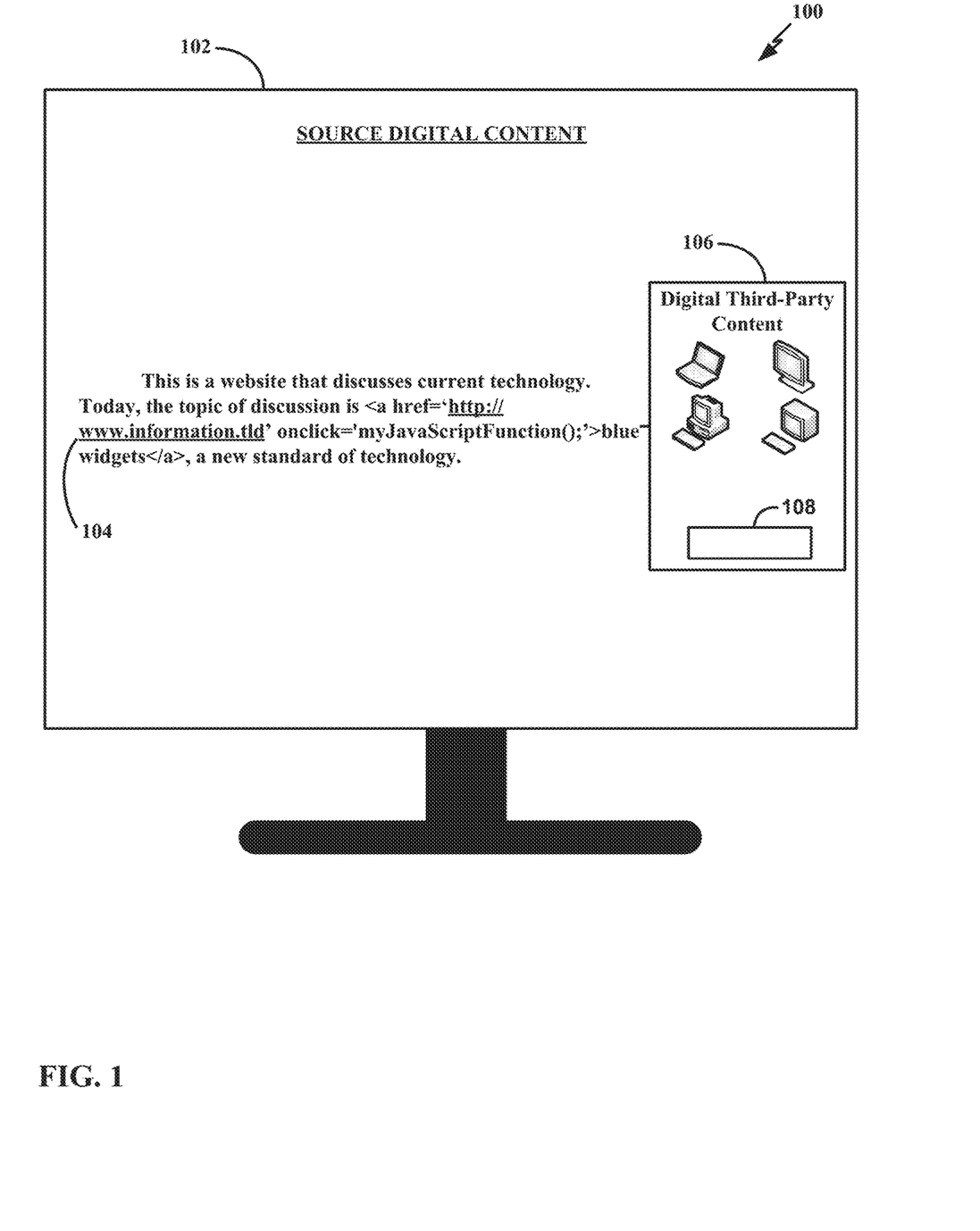
FIG. 1 is a diagram illustrating an example website that includes an auction-initiating script invoked from a hyperlink, according to aspects of the present disclosure.

FIG. 1 illustrates a source webpage 100 that includes source digital content 102. The source digital content 102 includes a hyperlink 104 with an embedded script (e.g., myJavaScriptFunction( );), according to aspects of the present disclosure. As shown in FIG. 1, the source digital content 102 may be content from a specific source webpage of a source website. In some examples, the source digital content 102 may be from an application, e.g., running on a computing device (e.g., a smart device, mobile phone, laptop, desktop computer, automobile smart system, or any computing device capable or running an application). The hyperlink 104 may be displayed on the specific webpage as anchor text, e.g., "blue widgets." Upon activation from a webpage visitor clicking on the hyperlink 104, the activation may cause the script to initiate an auction to be performed by an auctioning platform (e.g., an external server (not shown in FIG. 1)).

In some examples, the activated hyperlink 104 may have previously been written as "<a href="http://www.bluewidgets.tld">blue widgets</a>," before a hyperlink editing assistant (e.g., hyperlink editing unit 770 shown in FIG. 7) modified the activated hyperlink 104 to its current form. For example, the source website may have previously had a set of preexisting hyperlinks that, when clicked, would redirect the webpage visitor to a new website. In this example, the source website owner or representative may have then executed the hyperlink editing assistant to modify the set of preexisting hyperlinks to add in the script, "myJavaScriptFunction( )," to each of the hyperlinks in the set of preexisting hyperlinks. In some examples, a representative from the source website may have manually modified the set of preexisting hyperlinks to add in the script. This way, with the additional script, the activated hyperlink 104 would initiate an auction while keeping the webpage visitor on the source webpage.

The auction may include a bidding process where a set of third-party websites compete for their own digital third-party content (e.g., digital third-party content 106) to display proximate to the source digital content 102. The winning third-party website of the bidding process may select content (e.g., their digital third-party content 106) characteristic of the activated hyperlink 104 to display within, e.g., a popup window that displays adjacent or within the source digital content 102. In some examples, the popup window, including the digital third-party content 106, may display adjacent, or proximate, to the activated hyperlink 104, within the source digital content 102 webpage. In some examples, the digital third-party content 106 may display outside, or partially outside, the source digital content 102 of the source website.

In some examples, the text within the source digital content 102 webpage may reformat (e.g., change position) to accommodate the popup that displays the digital third-party content 106. For example, if the text within the source digital content 102 webpage leaves little or no room for displaying the digital third-party content 106, a portion of the text may change position by moving down a number of spaces, or shifting to the left portion of the source webpage, to fit the digital third-party content 106 within the source digital content 102 webpage. In some examples, the digital third-party content 106 may cover a portion of the source digital content 102 (e.g., text, image, or video content).

The third-party content 106 may include content (e.g., advertisements, products, text, images, videos, etc.) that is characteristic of the activated hyperlink 104. For example, if the activated hyperlink 104 includes anchor text that reads "blue widgets," as indicated in FIG. 1, the third-party digital content may include information associated with one or more blue widget products (e.g., the four computer product icons), as shown within the digital third-party content 106. In some examples, the digital third-party content 106 display may include a communication bar 108 for the user to communicate with a representative of the third-party website. In this example, the webpage visitor and the representative may exchange communication regarding products, or the webpage visitor may send the representative his contact information. In some examples, the communication bar 108 may be a question and answer system that responds to webpage visitor questions by outputting answers from a commonly asked questions page that match the user question. In some examples, the communication bar 108 may be a product search bar where the webpage visitor can search for products posted within the third-party website without leaving the source website.

In some examples, the communication bar 108 may be a request application where the user may request a different product than the products within the digital third-party content 108 for viewing within the digital third-party content 106 popup. For example, the products displayed within the digital third-party content are various blue widgets, but the user may wish to view products within the digital third-party content 106 that are related to skiing or basketball. In this example, the user may input skiing or basketball within the communication bar 108, and the third-party website may replace the blue widget content with content related to skiing or basketball. In some examples, the user may input their email address and any contact information they have to the communication bar 108. The user may also input queries unrelated to any product within the third-party website for information about the company or contact information.

The digital third-party content 106 may be substantially similar to content within the third-party's original website. That is, the content may be substantially similar to content within the third-party website shown had the user entered in the URL for the third-party website into a search engine. In some examples, the third-party digital content 106 website may modify content from the original website to only include content that relates to characteristics of the activated hyperlinks. For example, if the hyperlink anchor text reads "blue widgets," content, within the source third-party webpage and related to blue widgets, may output and display within the digital third-party content 106, along with a background computing theme.

In some examples, the third-party website may customize the digital third-party content 106 based on information about the webpage visitor. For example, the source website may send the third-party website information (e.g., purchase history, age, birthdate, etc.) about the webpage visitor, and the third-party website may customize the digital third-party content 106 to attract the webpage visitor, e.g., by including a product that the webpage visitor may be likely to purchase based on his purchase history.

Figure 2:
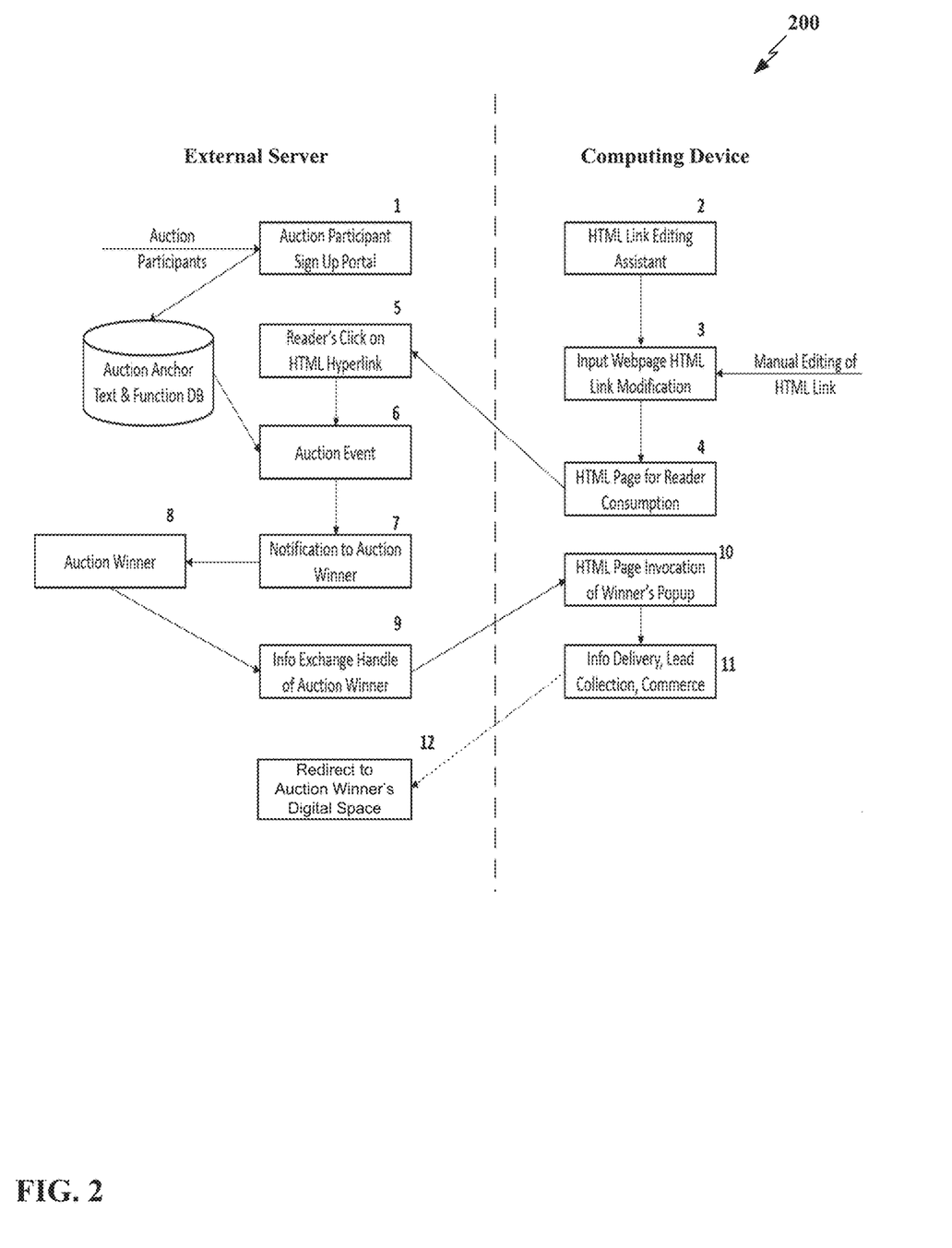
FIG. 2 is a diagram illustrating example communications between an example external server and a computing device, according to aspects of the present disclosure.

FIG. 2 illustrates an example auctioning platform process 200 being initiated, upon a source webpage visitor clicking a hyperlink within the source webpage, on a computing device and being performed on an external server. As shown in FIG. 2, auction participants (e.g., third-party websites) may sign up within an auctioning sign-up portal (1). In some examples, the signing up may occur prior to, or upon, a user activating a hyperlink (e.g., the activated hyperlink 104). For example, the sign-up portal may occur prior to activating the hyperlink and is not exclusive to characteristics of a particular activated hyperlink, but open to any third-party website. Upon activating the hyperlink, a processing unit within the auctioning platform may transmit characteristics of the hyperlink (e.g., in the form of one or more keywords describing the hyperlink) to the auctioning platform. Within the auctioning platform, a filtering process may occur where each of the signed-up third-party websites may be filtered according to keywords describing characteristics of the third-party websites. Then, those filtered signed-up third-party websites matching keywords describing characteristics of the hyperlink may remain to participate in the auction.

In some examples, a representative from the source website may upload a hypertext markup language (HTML) link editing assistant (e.g., link editing unit 770) to the computing device (2). The HTML link editing assistant may be programmed to modify any hyperlinks within the source digital content (e.g., source digital content 102) that are in the form of anchor text to include a script that will initiate the auction performed on the auctioning platform. The modified hyperlinks including the script may be substantially similar to the activated hyperlink 104. The HTML link editing assistant may modify the hyperlink by identifying any anchor text within the webpage and automatically modifying the hyperlink to include the script. In some examples, modifying the anchor text may occur by a user manually editing the anchor text HTML link to include the script. In some examples, the webpage HTML modification may occur when the user activates the editing assistant or when he begins to manually edit the anchor text (3).

Once the script has been inserted into each of the hyperlinks within the source website, either manually by the user or automatically by the HTML link editing assistant, the source webpage is ready for a webpage visitor to view (4). When the source webpage attracts webpage visitors, one of them may click on a desired hyperlink (e.g., the activated hyperlink 102) (5). The reader clicking the hyperlink may activate the script, in turn initiating the auctioning event (6). The auctioning platform may execute algorithms to determine a preferred third-party website, and then notify the winner (i.e., the preferred third-party website) (7) of winning the auctioning event (8). In some examples, the notification may an automated message sent to a representative of the third-party website or to an email address associated with the third-party website.

The auctioning platform may transfer data relating to digital third-party content (e.g., the digital third-party content 106) of the auction winner to the source webpage of the computing device (9). The data relating to the digital third-party content may be a digital representation of what the auction winner prefers for the appearance and content of the digital third-party content. For example, the data may include digital images of products, advertisement, text related to the products or to contact information, a communication bar for exchanging messages with a representative of the third-party website, etc. In addition, the data may include preference of the third-party website for the size and background coloring of the digital third-party content and where the digital third-party content may appear within the source digital content.

Upon receiving the data representative of the digital third-party content, the source webpage may invoke, e.g., a popup window to display the digital third-party content (10).

Placement of the digital third-party content may be according to a placement preference within the data or may be according to a preference of the source website. For example, the source website may have predefined locations within the webpage for the digital third-party content to appear within. In this example, any of the source digital content (e.g., source digital content 102) may be repositioned so that the digital third-party content conforms within the source webpage. For example, adjacent lines of text of the source digital content that includes the activated hyperlink may be spaced further apart so that the digital third-party content may fit within the adjacent lines of text. In some examples, the text, images, or video of the source digital content may shift to the left of the source webpage so that the digital third-party content may fit on a right side to the source digital content. Any information collected by the source webpage about the webpage visitor, including historical purchases, search history, contact information (e.g., email, phone number, and the like), etc., may then be transferred to the preferred third-party website (11).

Once the digital third-party content is displayed within the source webpage, the webpage visitor may interact with the digital third-party content. For example, the webpage visitor may purchase items for sale within the digital third-party content, input his email address or any contact information, exchange correspondence with a representative or bot from the third-party website, etc. In some examples, there may be a predetermined threshold that is an arbitrary numerical value set by either the preferred third-party website or the source webpage indicating an amount of time and/or quality of interactions between the webpage visitor and the digital third-party content. The arbitrary numerical value may correspond to a total number of message exchanges between the webpage visitor and the third-party representative or bot, a total number of times the webpage visitor selects content or products within the digital third-party content, the total time that the webpage visitor interacts with the digital third-party content, etc., or a combination thereof. Upon the predetermined threshold being satisfied, the source webpage may redirect the webpage visitor to the preferred third-party website (12). In some examples, the user may not satisfy the predetermined threshold and remain on the source webpage.

Figure 3:
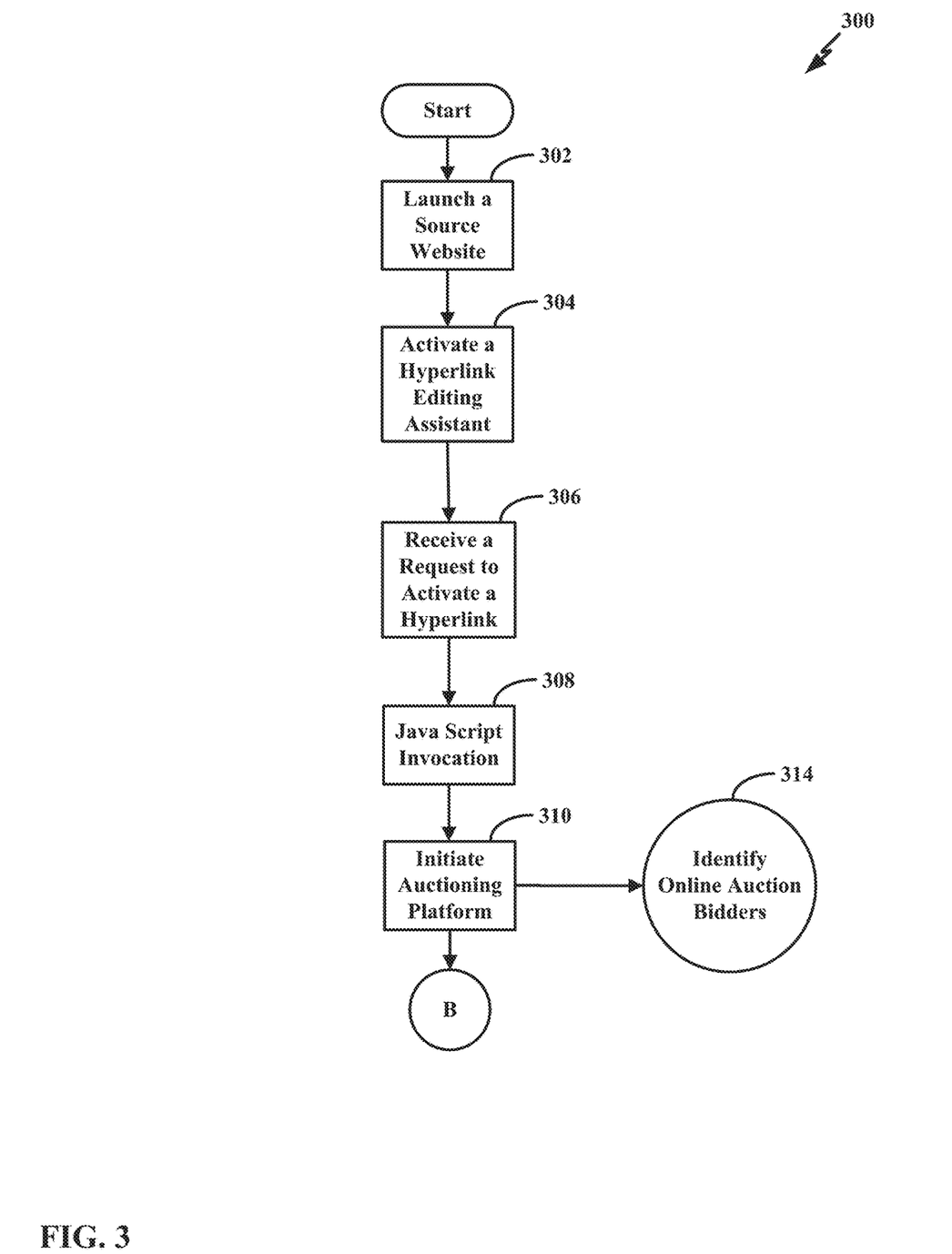
FIGS. 3-4 are flowcharts illustrating an example process for initiating an auction, according to aspects of the present disclosure.

FIG. 3 is a flowchart illustrating a auctioning process 300 for invoking an auctioning platform (e.g., on an external server) to determine a preferred third-party website, according to various embodiments. FIG. 3 is described with respect to FIGS. 1 and 2. As shown in FIG. 3, a user launches a source website utilizing a computing device (302), e.g., the computing device described in FIG. 2. The source website may include on each webpage a set of hyperlinks in the form of anchor text. In some examples, the set of hyperlinks may include a preexisting script embedded within the anchor text that, when executed, initiates an auctioning platform on an external server (e.g., the external server from FIG. 2). In some examples, the script may have been automatically, or manually, added to the anchor text by either an HTML link editing assistant (e.g., the link editing unit 770), or by the user, respectively (304). For example, the computer device may be running an HTML link editing assistant, and the HTML link editing assistant may, upon a request by the user, automatically replace any hyperlink without the script, with a hyperlink that includes the script. In some examples, the user may manually edit each hyperlink by adding a set of characters comprising the script to the hyperlink.

Once the webpage includes at least one hyperlink that includes a script, the link editing assistant may receive a request to activate the hyperlink by, e.g., a webpage visitor clicking on the link (306). This may, in turn, invoke the script (e.g., a Java script) (308) to initiate the auctioning platform (310) on an external server (e.g., the external server illustrated in FIG. 2). In some examples, the auctioning platform may begin by identifying a set of third-party websites that have signed up to participate in the auctioning process (314). For example, the set of third-party websites may be organized within the auctioning platform according to certain keywords and characteristics based on content within each of the third-party websites. For example, if a particular third-party website is directed to different colored widgets, then a keyword for the particular third-party website may be widgets, blue widgets, red widgets, etc. The anchor text of the activated hyperlink may read "blue widgets." In this example, the auctioning platform may match the anchor text reading "blue widgets" of the activated hyperlink with the keyword of the particular third-party website "blue widget," identifying the particular third-party website.

Figure 4:
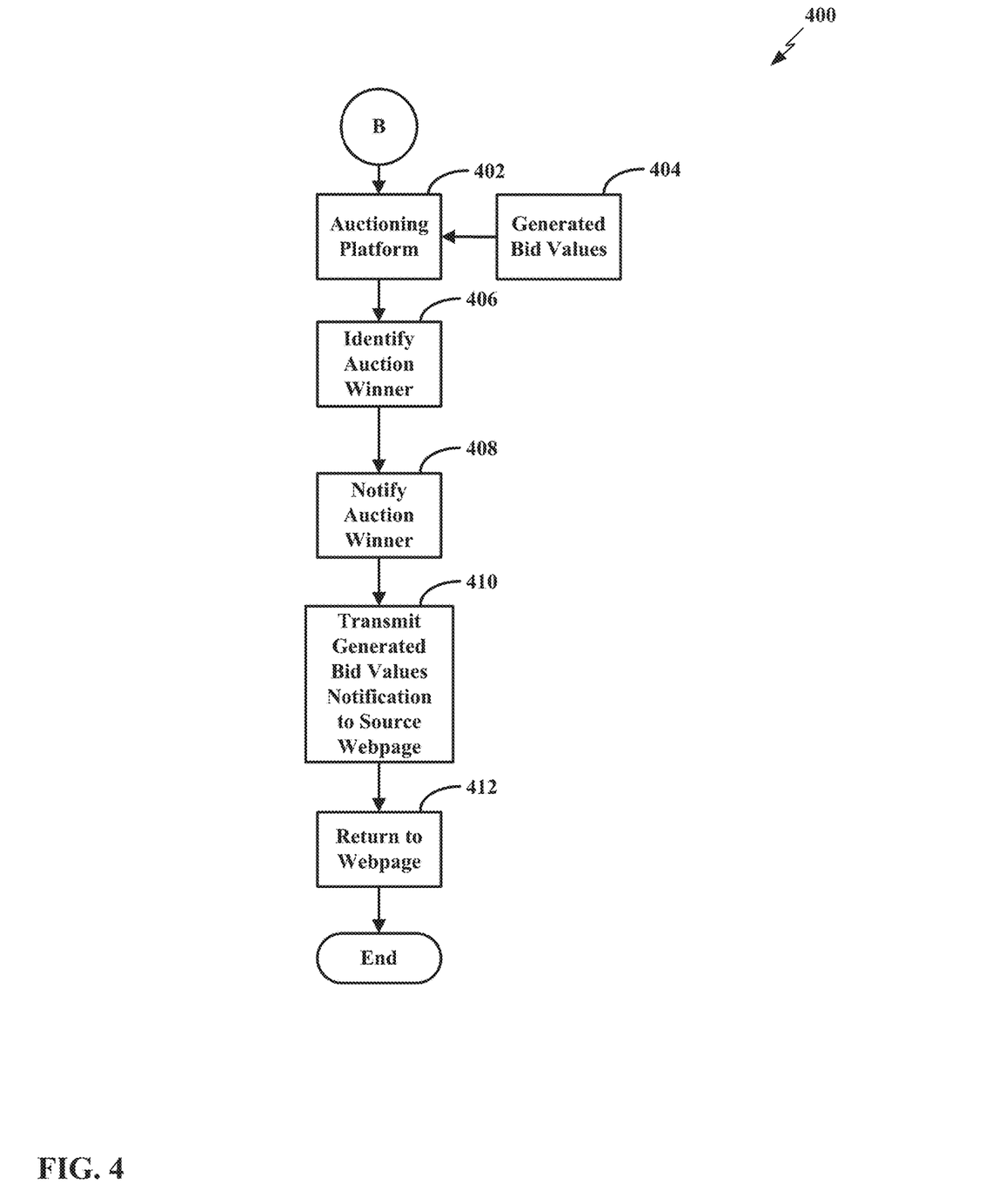

FIG. 4 is a flowchart illustrating the auctioning process continuing from FIG. 3 for initiating an auctioning platform to determine a preferred third-party website. FIG. 4 is described with respect to FIGS. 1, 2, and 3. As shown in FIG. 4, in some examples, the auctioning platform process 400 may initiate the auction once the hyperlink is activated and once the auctioning platform identifies the third-party websites (402). The auctioning platform may receive generated bids from the identified third-party websites (404). The generated bids may be on-the-fly bids based on the information related to the webpage visitor or may be predetermined bids set by each of the participating third-party websites. Based on the received, generated bids, the auctioning platform may identify an auction winner (e.g., the preferred third-party website) (406). In some examples, the auctioning platform may select two or more third-party websites based on a ranking system that may take into account the values of the generated bids or whether the source website will allow more than a predetermined number of third-party websites to win the auction.

The auctioning platform may then notify the auction winner(s) (e.g., the preferred third-party website(s)) of winning the auction (408). At 410, the link editing unit 770 may transmit the highest generated values, from the one or more preferred third-party websites, in the form of a notification to the source webpage. The link editing unit 770 may store the each of the bid values within a database comprising historical generated bids, the associated third-party websites, etc. In some examples, the notification may include preferences for how the third-party website(s) would like their associated digital third-party content to appear within the source webpage along with the source digital content (e.g., source digital content 102). For example, the preferences may include a location within the source digital content, a size of the popup that displays the digital third-party content, whether the third-party website would like the popup to cover any existing text within the source digital content, etc.

At 412, the auctioning platform may end, and at this time, the process may return to operations performing on the source webpage, the computing device (e.g., the computing device from FIG. 2). At this time, all information gathered (total number of bidders, each of the generated bid values, a progression of monetary values of each generated bid throughout the bidding process, etc.) during the auctioning process on the external server may have been transmitted to the source webpage to be used in future auctioning platforms or for statistical analysis.

Figure 5:
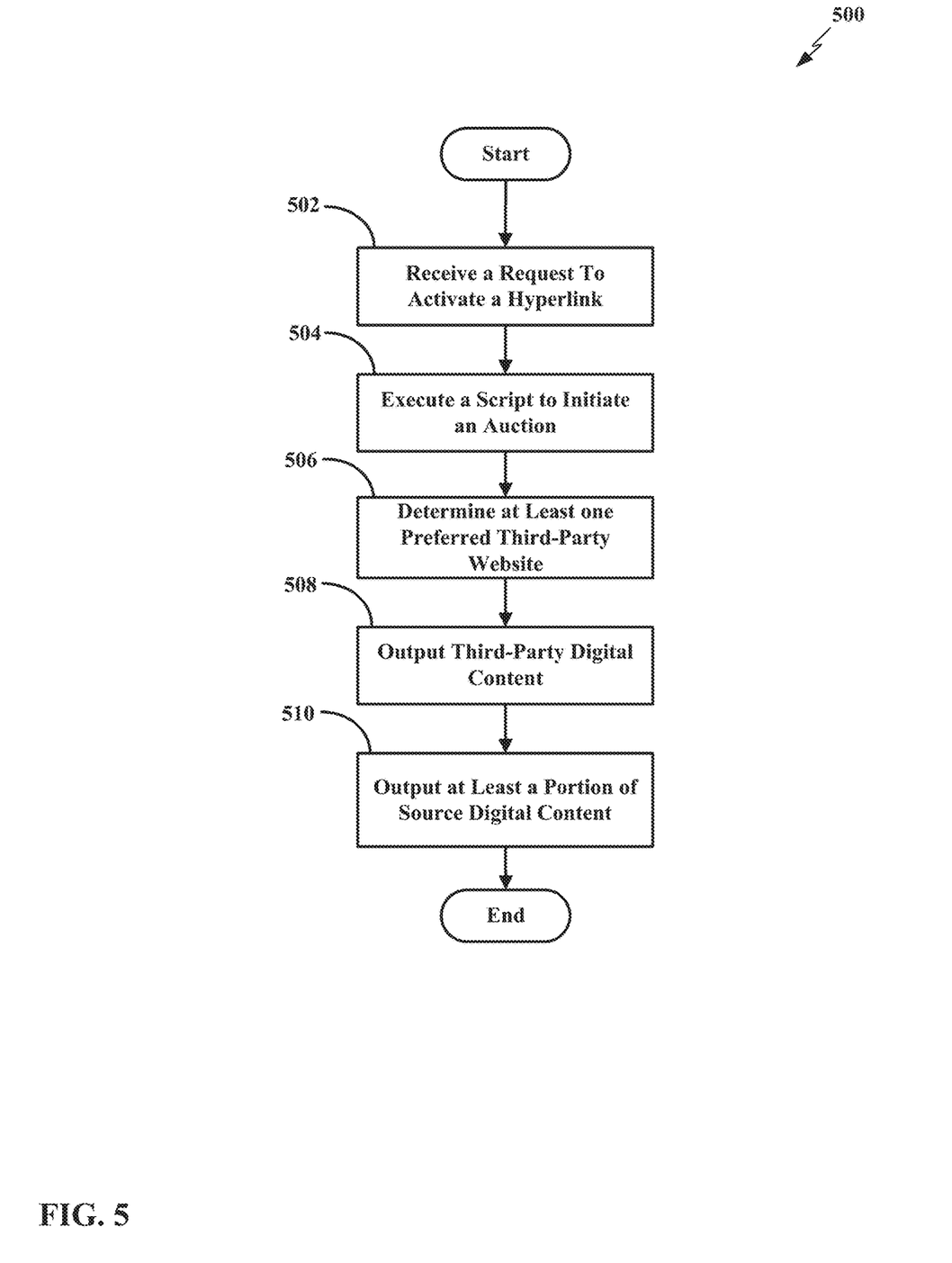
FIG. 5 is a flowchart illustrating an example process for outputting preferred third-party content, according to aspects of the present disclosure.

FIG. 5 is a flowchart illustrating a process 500 for outputting digital third-party content while also outputting source digital content. FIG. 5 is described with respect to FIGS. 1-4. As shown in FIG. 5, at 502, a link editing assistant (e.g., the link editing unit 770) may receive a request to activate a hyperlink within a source webpage (e.g., the hyperlink 104 within the source digital content 102). In some examples, the request may be generated by a source webpage visitor clicking on the hyperlink, wishing to view content described by anchor text embedded within the hyperlink. In some examples, the hyperlink may include a script that initiates an auctioning platform, described above with reference to FIGS. 1-4. The script may be a Java script function defined to retain the source webpage visitor within the source webpage, rather than redirect the source webpage visitor to a next website, while also granting the source webpage visitor access to content related to the anchor text.

For example, the source webpage visitor may wish to visit a webpage that relates to the anchor text, "bicycles." At 504, rather than redirecting the source webpage visitor to a website, e.g. "bicycles.com," activating the hyperlink executes the script, in turn initiating an auctioning platform, where a set of third-party websites bid on displaying their digital third-party content to the source webpage visitor. The auction may occur on an auctioning platform (e.g., the external server described in FIG. 2). Each bidding third-party website of the set of third-party websites may be a website that relates to characteristics of the anchor text description. For example, if the anchor text is "bicycles," website URLs of the set of third-party websites may include "bikes.com," "tricycles.com," "bicycles.com," etc.

As described with reference to FIGS. 1-4, the auction will determine at least one winner (preferred third-party website) from the set of third-party websites, and the source website may display the winning third-party digital content for viewing, and also for exchanging content between the source webpage visitor and the third-party website.

The script execution, at 504, may cause the source website to transmit any collected source website visitor behavior (e.g., in the form of metadata), such as purchase history, product selection history, etc. to the auctioning platform for set of third-party websites to use as a basis for determining their bid values. For example, if there is a high likelihood that the source website visitor will spend over a thousand dollars on a bicycle, based on the source website visitor's purchase history, then the bidding third-party websites may bid a higher amount than if there was a high likelihood that the source website visitor spending less than three-hundred dollars on a bicycle. In addition, websites selling higher-end bicycles may decide to leave the auction based on a likelihood the source webpage visitor spending less than a certain amount on a bicycle.

At 506, the link editing assistant (e.g., the link editing unit 770) may determine at least one preferred third-party website of the set of third-party websites to be the auction winner. This determination may be based on the results of the auction. The results may have been transmitted from the auctioning platform to the link editing assistant for the link editing assistant to make the determination. The preferred third-party website may, in some cases, be based on an algorithm created by the source website that considers, e.g., a highest bid amount entered by the preferred third-party website, past relationships with a particular third-party website, potential future relationships with the particular third-party website, etc.

In some examples, the auction may result in more than one preferred third-party website having a desirable bid amount. In this case, the link editing assistant may determine that both of the two or more websites may have their digital third-party content displayed within the source website without any interference to either the source website content or to each of the digital third-party contents. For example, products that each of the preferred third-party websites wish to include within their respective digital third-party content are not too large or too many for convenient fitting, or viewing, within the source webpage content. Convenient fitting or viewing may include that the source digital content does not need to be rearranged in such a way that the source webpage visitor has a difficult time viewing the digital third-party content or the source digital content.

Additional metadata to the metadata transmitted to the auctioning platform, at 504, about the source webpage visitor, collected by the source website, may be transmitted to the winning third-party website to assist in identifying which products to include within the digital third-party content. This additional metadata may include the source webpage visitor's contact information, including email address, phone number, etc.

At 508, the link editing assistant may output the third-party digital content (e.g., a popup) for display adjacent or proximate to the source digital content. The digital third-party content may be representative of characteristics of the preferred third-party website that are associated with the characteristics of the activated hyperlinks. In some examples, the outputted display may fit a theme of the anchor text or of the source website. For example, the source website may be a weather website; the digital third-party content, e.g., background may include icons representing weather. For example, the anchor text may read "lightning" and the source website is a weather website; the digital third-party content background may include lightning icons or icons representative of stormy weather.

In some examples, the anchor text may be unrelated to the theme of the source website. For example, the anchor text reads "bicycles" and the source website is a weather website. In this example, the digital third-party content may display bicycles for the source webpage visitor to purchase, however the theme of the digital third-party content may be weather and include a sun icon or a background of clear skies.

In some examples, the source website may determine the characteristics and features of the digital third-party content. In some examples, the preferred third-party website may determine the characteristics and features of the digital third-party content. The characteristics and features may include the elements (e.g., items for purchase, a communication bar, search bar, etc.) represented by the digital third-party content 106. For example, the communication bar 108 and the one or more products displayed within the popup may be displayed within the outputted digital third-party content, in addition to contact information, etc.

Figure 6:
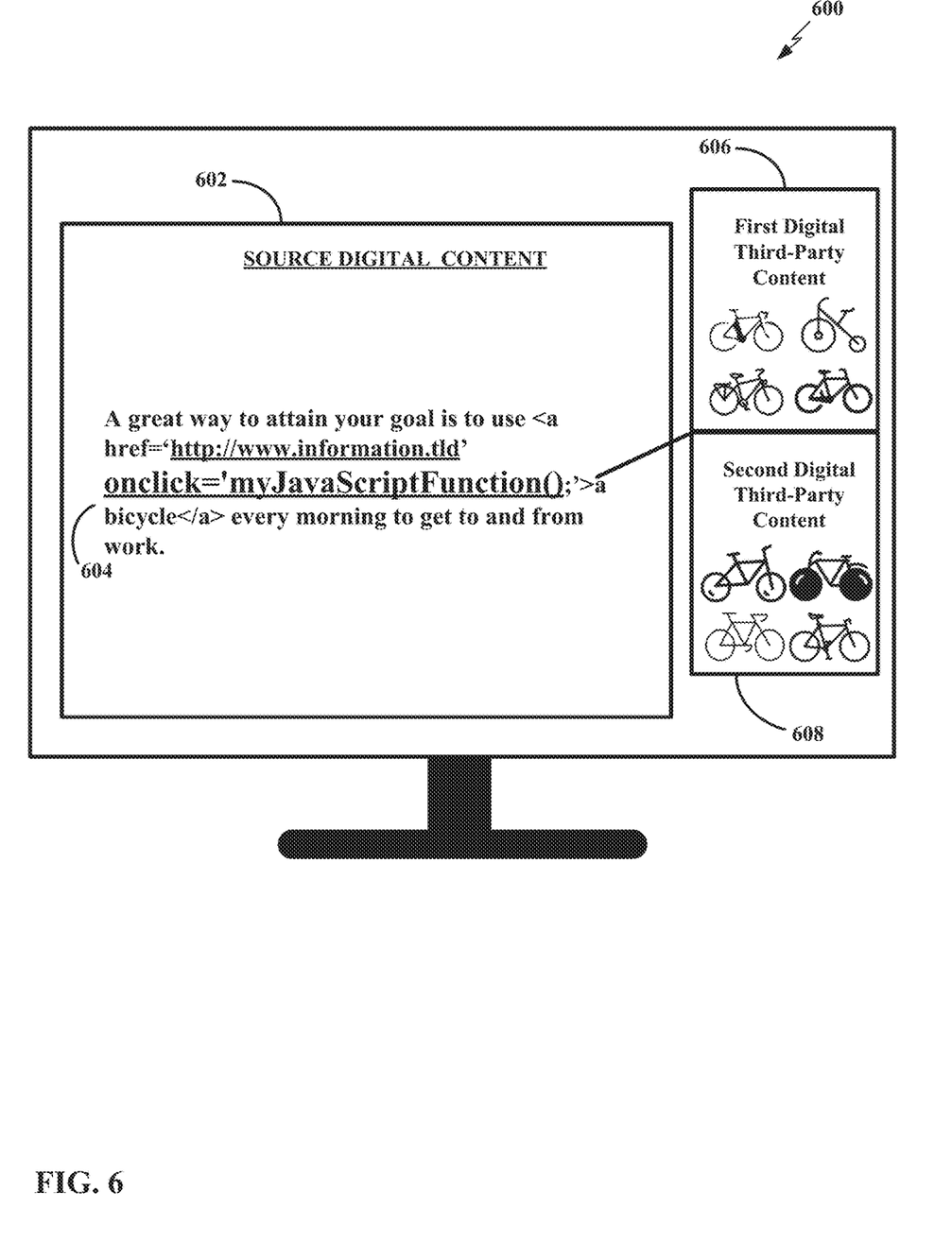
FIG. 6 is a diagram illustrating example output of both a first and second third-party webpages adjacent to source digital content, according to aspects of the present disclosure.

In some examples, the source website may determine the position of the digital third-party content based on, e.g., the size and any overcrowding of the source digital content. In this example, the link editing assistant may then place the digital third-party content in a position that is adjacent to the source digital content (e.g., first third-party content 606 is adjacent to source digital content 602, whereas digital third-party content 106 is within the source webpage 102). In some examples, the source digital content may be repositioned is such a way to include the digital third-party content without overcrowding the source digital content.

At 510, the link editing assistant outputs at least a portion of the source digital content while outputting the digital third-party content. For example, as illustrated by FIG. 1, the link editing assistant is outputting the digital third-party content 106 while also outputting the source digital content 102. In some examples, outputting the source digital content and the digital third-party content is in a way that the webpage visitor may interact seamlessly with either content, e.g., without having to reposition the popup or the source webpage to view either content. For example, the user may transition from viewing and/or exchanging communication with the third-party website and then utilize features of the source digital content without either the source digital content or the digital third-party content interfering with the other content. In some examples, if the webpage visitor selects a product of the digital third-party content, the source digital content will not disappear.

In some examples, the size of the popup displaying the digital third-party content may increase or decrease depending on the quality of interaction between the webpage visitor and the digital third-party website. In other words, the size of the popup displaying the digital third-party digital content may be proportional to an amount of time the webpage visitor consecutively spends interacting with either the source digital content or the digital third-party content. For example, when the webpage visitor is interacting with the digital third-party content for longer than five consecutive minutes, the popup displaying the digital third-party content may increase in size. Likewise, if the webpage visitor is interacting with the source webpage content for longer than five minutes, the digital third-party content may decrease in size. In some examples, when there is more than one preferred third-party digital website, the webpage visitor viewing a first digital third-party content for longer than five minutes might cause the link editing assistant to increase the first digital third-party content and decrease either the source digital content or the second digital third-party content, or both.

FIG. 6 illustrates an example source webpage 600 including both a first digital third-party content 606 and a second digital third-party content 608 displaying products that may be included within their respective third-party websites within a popup, adjacent to source digital content 602. In some examples, a link editing assistant (e.g., link editing unit 770) outputs both the first and second digital third-party websites 606, 608 due to a webpage visitor clicking on the hyperlink 604, which includes an embedded script, e.g. "myJavaScriptFunction( )." The user clicking the hyperlink 604 executes the script, in turn initiating the auctioning platform. The hyperlink 604 may have been modified by the link editing unit 770, or any program capable of modifying hyperlinks within a webpage (e.g., the HTML link editing assistant discussed with reference to FIG. 2) or manually by an editor of the source webpage.

In some examples, the link editing unit 770 may further display both the first digital third-party content 606 and the second digital third-party content 608 based on both a first third-party website and a second third-party website winning the auction being performed by the auctioning platform (e.g., on an external server). Both the first third-party website and the second third-party website winning may be based on both websites having the highest bid values out of a set of bids submitted by a set of third-party websites. The first third-party website may have had the highest bid and the second third-party website may have had the second highest bid. Based on this, the first digital third-party content 606 may have a position adjacent to the source digital content 602 that is above the second digital third-party content 608.

As suggested by the anchor text, "a bicycle," within the hyperlink 604, each of the winning third-party websites have characteristics relating to bicycles. For example, both the first third-party digital content 606 and the second third-party digital content 608 have four different bicycle icons for purchase within their respective digital third-party content 606, 608. In addition to the bicycle icons within their respective digital third-party content 606, 608, each of the third-party websites may have included a communication bar (e.g., the communication bar 108), contact information, or any other product or form of advertisement desirable by each of the winning third-party websites.

In some examples, both the first and second digital third-party websites 606, 608 may have a background that fits a theme of the source website. For example, the source website is a nutrition website, and the reference within the text of source digital content is based on bicycling to work as a way to become more active. So, the background of both the first and second digital third-party websites 606, 608 may be themes that fit a healthy lifestyle (e.g., people running on the beach). In some examples, the background may be characteristics of the anchor text, "bicycle."

In some examples, both the first and second digital third-party websites 606, 608 may be adjacent to the source digital content 102, rather than included within the source digital content 602. This configuration may be due to both the first and second digital third-party websites 606, 608 occupying more space than a predetermined threshold, possibly causing overcrowding had both the first and second digital third-party websites 606, 608 been included within the source digital content 602. In some examples, both the first and second digital third-party websites 606, 608 may be included within the source digital content 602. For example, content of the source digital content 602 may be rearranged (e.g., by rearranging text, images, videos, etc.) to fit the first and second digital third-party websites 606, 608 within the source digital content 602.

Figure 7:
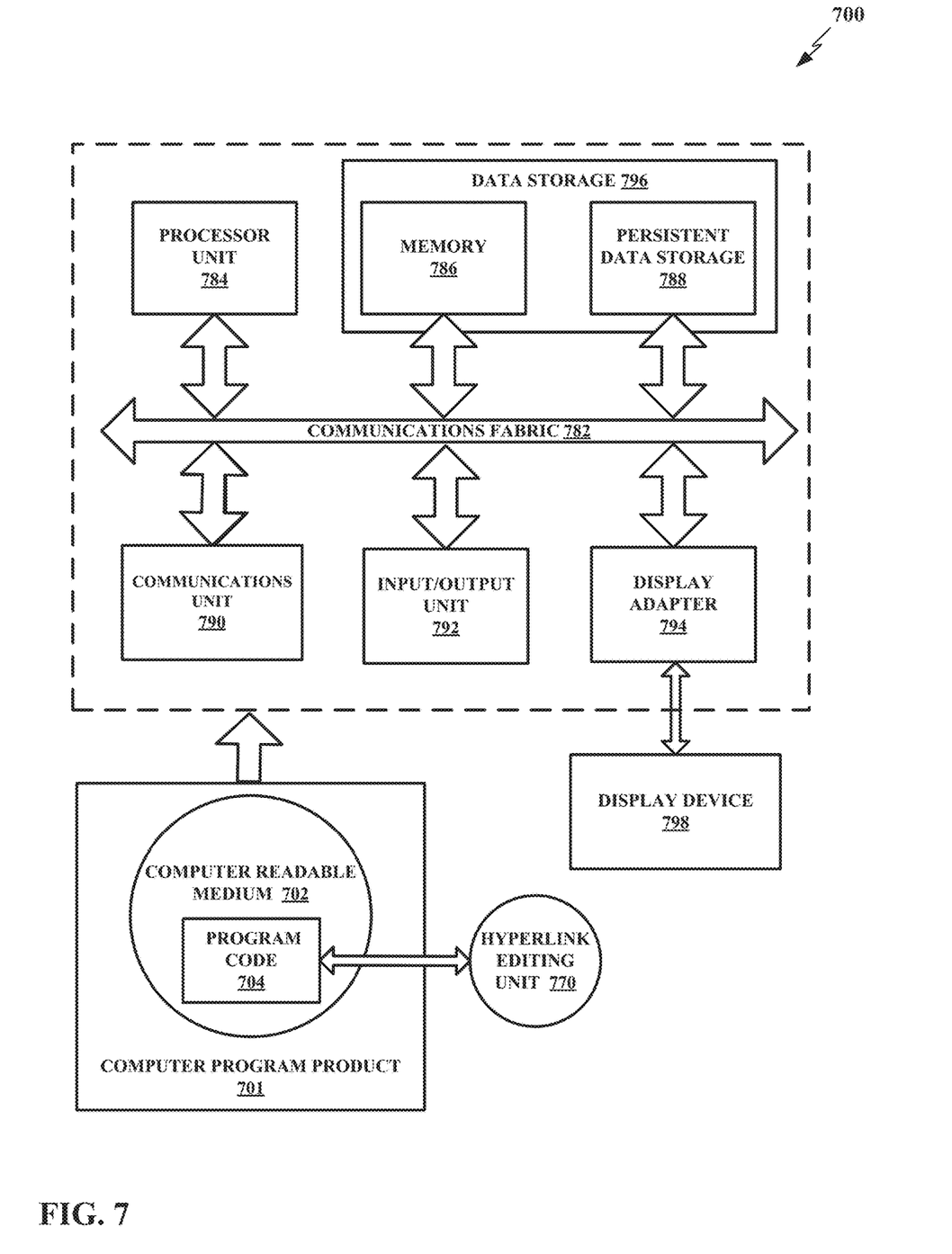
FIG. 7 is a diagram illustrating an example computing device, according to aspects of the present disclosure.

FIG. 7 is a block diagram of a computing device 700 that may be used to perform the techniques of the present disclosure. Computing device 700 may be an example of one or more of any of the computing systems described in FIG. 2, such as the computing device or the external server. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 700 may include a computer having capabilities or formats other than or beyond those described herein.

In the illustrative example of FIG. 7, computing device 700 includes communications fabric 782, which provides communications between processor unit 784, memory 786, persistent data storage 788, communications unit 790, and input/output (I/O) unit 792. Communications fabric 782 may include a dedicated system bus, a general system bus, multiple buses arranged in hierarchical form, any other type of bus, bus network, switch fabric, or other interconnection technology. Communications fabric 782 supports transfer of data, commands, and other information between various subsystems of computing device 700.

Processor unit 784 may be a programmable central processing unit (CPU) configured for executing programmed instructions stored in memory 786. In another illustrative example, processor unit 784 may be implemented using one or more heterogeneous processor systems in which a main processor is present with secondary processors on a single chip. In yet another illustrative example, processor unit 784 may be a symmetric multi-processor system containing multiple processors of the same type. Processor unit 784 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 784 may include a multi-core processor, such as a dual core or quad core processor, for example. Processor unit 784 may include multiple processing chips on one die, and/or multiple dies on one package or substrate, for example. Processor unit 784 may also include one or more levels of integrated cache memory, for example. In various examples, processor unit 784 may comprise one or more CPUs distributed across one or more locations.

Data storage 796 includes memory 786 and persistent data storage 788, which are in communication with processor unit 784 through communications fabric 782. Memory 786 can include a random-access semiconductor memory (RAM) for storing application data, i.e., computer program data, for processing. While memory 786 is depicted conceptually as a single monolithic entity, in various examples, memory 786 may be arranged in a hierarchy of caches and in other memory devices, in a single physical location, or distributed across a plurality of physical systems in various forms. While memory 786 is depicted physically separated from processor unit 784 and other elements of computing device 700, memory 786 may refer equivalently to any intermediate or cache memory at any location throughout computing device 700, including cache memory proximate to or integrated with processor unit 784 or individual cores of processor unit 784.

Persistent data storage 788 may include one or more hard disc drives, solid state drives, flash drives, rewritable optical disc drives, magnetic tape drives, or any combination of these or other data storage media. Persistent data storage 788 may store computer-executable instructions or computer readable program code for an operating system, application files comprising program code, data structures or data files, and any other type of data. These computer-executable instructions may be loaded from persistent data storage 788 into memory 786 to be read and executed by processor unit 784 or other processors. Data storage 796 may also include any other hardware elements capable of storing information, such as, for example and without limitation, data, program code in functional form, and/or other suitable information, either on a temporary basis and/or a permanent basis.

Persistent data storage 788 and memory 786 are examples of physical, tangible, non-transitory computer readable data storage devices. Data storage 796 may include any of various forms of volatile memory that may require being periodically electrically refreshed to maintain data in memory, while those skilled in the art will recognize that this also constitutes an example of a physical, tangible, non-transitory computer readable data storage device. Executable instructions may be stored on a non-transitory medium when program code is loaded, stored, relayed, buffered, or cached on a non-transitory physical medium or device, including if only for only a short duration or only in a volatile memory format.

Processor unit 784 can also be suitably programmed to read, load, and execute computer-executable instructions or computer readable program code. This program code may be stored on memory 786, persistent data storage 788, or elsewhere in computing device 700. This program code may also take the form of program code 704 stored on computer readable medium 702 comprised in computer program product 700, and may be transferred or communicated, through any of a variety of local or remote means, from computer program product 700 to computing device 700 to be enabled to be executed by processor unit 784, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft Corporation, a network operating system such as JavaOS® from Oracle® Corporation, or any other suitable operating system. Processor unit 784 can be suitably programmed to read, load, and execute instructions of the operating system.

Communications unit 790, in this example, provides for communications with other computing or communications systems or devices. Communications unit 790 may provide communications through the use of physical and/or wireless communications links. Communications unit 790 may include a network interface card for interfacing with an Ethernet adapter, a Token Ring adapter, a modem for connecting to a transmission system such as a telephone line, or any other type of communication interface. Communications unit 790 can be used for operationally connecting many types of peripheral computing devices to computing device 700, such as printers, bus adapters, and other computers. Communications unit 790 may be implemented as an expansion card or be built into a motherboard, for example.

The input/output unit 792 can support devices suited for input and output of data with other devices that may be connected to computing device 700, such as keyboard, a mouse or other pointer, a touchscreen interface, an interface for a printer or any other peripheral device, a removable magnetic or optical disc drive (including a portable compact disc read-only memory (CD-ROM), a digital versatile disk read-only memory (DVD-ROM), or Blu-Ray), a universal serial bus (USB) receptacle, or any other type of input and/or output device. Input/output unit 792 may also include any type of interface for video output in any type of video output protocol and any type of monitor or other video display technology, in various examples. It will be understood that some of these examples may overlap with each other, or with example components of communications unit 790 or data storage 796. Input/output unit 792 may also include appropriate device drivers for any type of external device, or such device drivers may reside elsewhere on computing device 700 as appropriate.

Computing device 700 also includes a display adapter 794 in this illustrative example, which provides one or more connections for one or more display devices, such as display device 798, which may include any of a variety of types of display devices. It will be understood that some of these examples may overlap with example components of communications unit 790 or input/output unit 792. Input/output unit 792 may also include appropriate device drivers for any type of external device, or such device drivers may reside elsewhere on computing device 700 as appropriate. Display adapter 794 may include one or more video cards, one or more graphics processing units (GPUs), one or more video-capable connection ports, or any other type of data connector capable of communicating video data, in various examples. Display device 798 may be any kind of video display device, such as a monitor, a television, or a projector, in various examples.

Input/output unit 792 may include a drive, socket, or outlet for receiving computer program product 701, which comprises a computer readable medium 702 having computer program code 104 stored thereon. For example, computer program product 701 may be a CD-ROM, a DVD-ROM, a Blu-Ray disc, a magnetic disc, a USB stick, a flash drive, or an external hard disc drive, as illustrative examples, or any other suitable data storage technology.

Computer readable medium 702 may include any type of optical, magnetic, or other physical medium that physically encodes program code 704 as a binary series of different physical states in each unit of memory that, when read by computing device 700, induces a physical signal that is read by processor unit 784 that corresponds to the physical states of the basic data storage elements of computer readable medium 702, and that induces corresponding changes in the physical state of processor unit 784. That physical program code signal may be modeled or conceptualized as computer readable instructions at any of various levels of abstraction, such as a high-level programming language, assembly language, or machine language, but ultimately constitutes a series of physical electrical and/or magnetic interactions that physically induce a change in the physical state of processor unit 784, thereby physically causing or configuring processor unit 784 to generate physical outputs that correspond to the computer-executable instructions, in a way that causes computing device 700 to physically assume new capabilities that it did not have until its physical state was changed by loading the executable instructions comprised in program code 704.

In some examples, the program code 704 may include instructions to invoke the hyperlink editing assistant 770 to perform operations, such as modifying a set of hyperlinks to include the script, outputting the digital third-party content adjacent or proximate to the source digital content, while outputting the source digital content, transmitting and receiving communication to, from an auctioning platform, and performing any other task as described with reference in FIGS. 1-6.

In some illustrative examples, program code 704 may be downloaded over a network to data storage 796 from another device or computer system for use within computing device 700. Program code 704 comprising computer-executable instructions may be communicated or transferred to computing device 700 from computer readable medium 702 through a hard-line or wireless communications link to communications unit 790 and/or through a connection to input/output unit 792. Computer readable medium 702 comprising program code 704 may be located at a separate or remote location from computing device 700, and may be located anywhere, including at any remote geographical location anywhere in the world, and may relay program code 704 to computing device 700 over any type of one or more communication links, such as the Internet and/or other packet data networks. The program code 704 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 704 may be transmitted from a source computer readable medium 702 over non-tangible media, such as communications links or wireless transmissions containing the program code 704. Program code 704 may be more or less temporarily or durably stored on any number of intermediate tangible, physical computer readable devices and media, such as any number of physical buffers, caches, main memory, or data storage components of servers, gateways, network nodes, mobility management entities, or other network assets, en route from its original source medium to computing device 700.

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

The invention claimed is:

1. A method, comprising:
   receiving a request to activate a hyperlink of a set of hyperlinks within a webpage of a source website;
   executing, based on characteristics of the activated hyperlink of the set of hyperlinks, a script to initiate an auction that is performed by an auctioning platform, wherein the auction comprises a bidding process that is associated with a set of third-party websites that are each different from the source website;
   determining, based on a result of the auction performed by the auctioning platform, at least one preferred third-party website selected from the set of third-party websites;
   outputting, for display within the webpage of the source website, third-party digital content representative of characteristics of the preferred third-party website that are associated with the characteristics of the activated hyperlink; and
   while outputting the first digital content, outputting, for display within the webpage of the source website, at least a portion of source digital content representative of characteristics of the source website.

2. The method of claim 1, wherein the set of hyperlinks comprises a first set of hyperlinks, the method further comprising:
   prior to receiving the request to activate the hyperlink, receiving user input associated with a second set of hyperlinks within the webpage of the source website; and
   modifying, based on the user input, the second set of hyperlinks to create the first set of hyperlinks.

3. The method of claim 2, wherein modifying the second set of hyperlinks to create the first set of hyperlinks comprises:
   modifying a set of characters in the second set of hyperlinks by automatically adding an additional set of characters identifying at least the script that initiates the auction performed by the auctioning platform, wherein the first set of hyperlinks includes at least the additional set of characters.

4. The method of claim 2, wherein modifying the second set of hyperlinks to create the first set of hyperlinks comprises:
   modifying a set of characters in the second set of hyperlinks to add an additional set of characters based on the user input, wherein the additional set of characters identify at least the script that initiates the auction performed by the auctioning platform, and wherein the first set of hyperlinks includes at least the additional set of characters.

5. The method of claim 1, further comprising:
   collecting user metadata representing historical user behavior on the webpage; and transmitting the user metadata representing the historical user behavior to the at least one preferred third-party website.

6. The method of claim 1, the method further comprising:
receiving an input, from a webpage visitor of the webpage, associated with a selection of an item within the third-party digital content provided by the third-party website;
determining that a predetermined threshold has been satisfied based on an amount of interaction between the webpage visitor and the third-party digital content provided by the third-party website; and
transferring, by the source website, the webpage visitor to the third-party website upon determining that the predetermined threshold has been satisfied.

7. The method of claim 1, wherein the third-party digital content that is representative of the characteristics of the preferred third-party website includes substantially the same content included at the preferred third-party website.

8. The method of claim 7, wherein the third-party digital content that is representative of the characteristics of the preferred third-party website further includes additional features designed based on a set of user characteristics.

9. A computing system comprising:
at least one processor;
at least one memory device; and
at least one module stored by the at least one memory device and executable by the at least one processor to:
receive a request to activate a hyperlink of a set of hyperlinks within a webpage of a source website;
execute, based on characteristics of the activated hyperlink of the set of hyperlinks, a script to initiate an auction that is performed by an auctioning platform, wherein the auction comprises a bidding process that is associated with a set of third-party websites that are each different from the source website;
determine, based on a result of the auction performed by the auctioning platform, at least one preferred third-party website selected from the set of third-party websites;
output, for display within the webpage of the source website, third-party digital content representative of characteristics of the preferred third-party website that are associated with the characteristics of the activated hyperlink; and
while outputting the first digital content, output, for display within the webpage of the source website, at least a portion of source digital content representative of characteristics of the source website.

10. The computing system of claim 9, wherein the set of hyperlinks comprises a first set of hyperlinks, wherein the at least one module is further executable by the at least one processor to:
prior to receiving the request to activate the hyperlink, receive user input associated with a second set of hyperlinks within the webpage of the source website; and
modify, based on the user input, the second set of hyperlinks to create the first set of hyperlinks.

11. The computing system of claim 10, wherein the at least one module executable by the at least one processor to modify the second set of hyperlinks to create the first set of hyperlinks is executable by the at least one processor to:
modify a first set of characters in the second set of hyperlinks by automatically adding a second set of characters identifying at least the script that initiates the auction performed by the auctioning platform, wherein the first set of hyperlinks includes at least the second set of characters.

12. The computing system of claim 10, wherein the at least one module executable by the at least one processor to modify the second set of hyperlinks to create the first set of hyperlinks is executable by the at least one processor to:
modify a first set of characters in the second set of hyperlinks to add a second set of characters based on the user input, wherein the second set of characters identify at least the script that initiates the auction performed by the auctioning platform, and wherein the first set of hyperlinks includes at least the second set of characters.

13. The computing system of claim 9, wherein the at least one module is further executable by the at least one processor to:
collect user metadata representing historical user behavior on the webpage; and
transmit the user metadata representing the historical user behavior to the at least one preferred third-party website.

14. The computing system of claim 9, wherein the at least one module is further executable by the at least one processor to:
receive an input, from a webpage visitor of the webpage, associated with a selection of an item within the third-party digital content provided by the third-party website;
determine that a predetermined threshold has been satisfied based on an amount of interaction between the webpage visitor and the third-party digital content provided by the third-party website; and
transfer, by the source website, the webpage visitor to the third-party website upon determining that the predetermined threshold has been satisfied.

15. The computing system of claim 9, wherein the third-party digital content that is representative of the characteristics of the preferred third-party website includes substantially the same content included at the preferred third-party website.

16. The computing system of claim 15, wherein the third-party digital content that is representative of the characteristics of the preferred third-party website further includes additional features designed based on a set of user characteristics.

17. A computer program product comprising a computer readable storage medium having program code embodied therewith, the program code executable by at least one processor to:
receive a request to activate a hyperlink of a set of hyperlinks within a webpage of a source website;
execute, based on characteristics of the activated hyperlink of the set of hyperlinks, a script to initiate an auction that is performed by an auctioning platform, wherein the auction comprises a bidding process that is associated with a set of third-party websites that are each different from the source website;
determine, based on a result of the auction performed by the auctioning platform, at least one preferred third-party website selected from the set of third-party websites;
output, for display within the webpage of the source website, third-party digital content representative of characteristics of the preferred third-party website that are associated with the characteristics of the activated hyperlink; and while outputting the first digital content, output, for display within the webpage of the source website, at least a portion of source digital content representative of characteristics of the source website.

18. The computer program product of claim 17, wherein the set of hyperlinks comprises a first set of hyperlinks, wherein the program code is further executable by the at least one processor to:
prior to receiving the request to activate the hyperlink, receive user input associated with a second set of hyperlinks within the webpage of the source website; and
modify, based on the user input, the second set of hyperlinks to create the first set of hyperlinks.

19. The computer program product of claim 18, wherein the program code executable by the at least one processor to modify the second set of hyperlinks to create the first set of hyperlinks is executable by the at least one processor to:
modify a first set of characters in the second set of hyperlinks by automatically adding a second set of characters identifying at least the script that initiates the auction performed by the auctioning platform, wherein the first set of hyperlinks includes at least the second set of characters.

20. The computer program product of claim 19, wherein the program code is further executable by the at least one processor to:
receive an input, from a webpage visitor of the webpage, associated with a selection of an item within the third-party digital content provided by the third-party website;
determine that a predetermined threshold has been satisfied based on an amount of interaction between the webpage visitor and the third-party digital content provided by the third-party website; and
transfer, by the source website, the webpage visitor to the third-party website upon determining that the predetermined threshold has been satisfied.

* * * * *